July 3, 1923.
F. D. COOK
1,460,888
METHOD OF CONTINUOUSLY MELTING VITREOUS ENAMELS
Filed Dec. 10, 1920
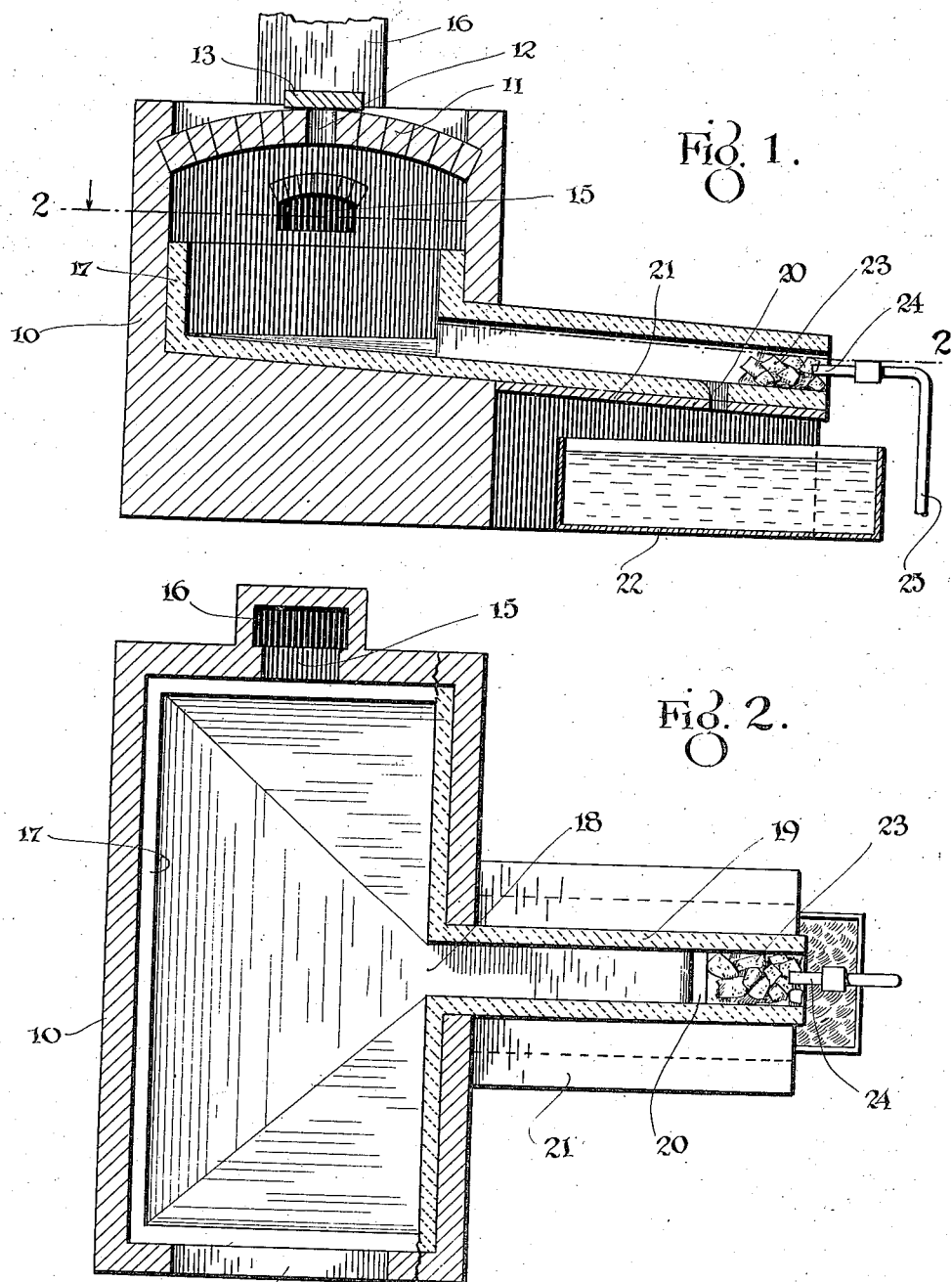
INVENTOR
Frederick D. Cook Patented July 3, 1923.

1,460,888

UNITED STATES PATENT OFFICE.

FREDERICK D. COOK, OF FAIRMONT, WEST VIRGINIA.

METHOD OF CONTINUOUSLY MELTING VITREOUS ENAMELS.

Application filed December 10, 1920. Serial No. 429,658.

*To all whom it may concern:*

Be it known that I, FREDERICK D. COOK, a citizen of the United States, and a resident of Fairmont, in the county of Marion and State of West Virginia, have invented certain new and useful Improvements in Methods of Continuously Melting Vitreous Enamels, of which the following is a specification.

My present invention relates particularly to an improved method and apparatus in connection with the melting of vitreous enamels utilized in enameling cast and sheet iron and has for its object the accomplishment in a single continuous operation what is now accomplished in intermittent operations so as to avoid delays, secure a more uniform product, and do away with the waste, existing at the present time.

Enamels to which the present invention relates are vitreous glasses made opaque by the addition of opacifying material to the mix for a clear glass, these opacifiers, being both what are known as accessory opacifiers such as various fluorides which give the glass a milky tinge, and what are known as real opacifiers such as tin or antimony oxide which are dissolved in the molten glass or do not combine with the glass ingredients except in a slight degree dependent upon the length of time the mix lies in the melting tank and the degree of heat to which it is subjected. The method now employed is to heat the tank which has a solid bottom and sides of refractory blocks, to the desired temperature and then to throw in the batch or mix on the floor of the tank. The material of the batch is spread out on the floor of the tank in the way best suited to attain its melting in the shortest time, and as the enamel melts, it flows sluggishly in a molten condition toward the lowest point of the floor of the tank which is located at the tap hole. The molten enamel collects in a pool of ever increasing proportions until the batch of raw materials has been completely melted, this point being reached when bubbling ceases and the molten enamel lies in a quiet pool about the tap hole. The tap hole is then broken through and the enamel allowed to discharge through a spout or flue which extends beyond the tank and is entirely open with its outer end above a vat filled with water. The enamel flows into the water where by its sudden cooling it is broken into small pieces. It is then removed from the vat, dried and ground to a fine powder. In the meantime the tank having emptied is again closed by plugging the tap hole and is ready for another charge.

The various materials of the batches intermittently fed through the charging aperture of the tank, are intimately mixed (usually in a mechanical mixer) before being thrown into the tank, and it is apparent that the complete enamel begins to form as soon as the material commences to melt. The top of the batch melts first and flows down toward the tap hole, and this initially melted portion of the enamel, must under present conditions, wait until the pile of raw material has completely melted, which may be about three or four hours. During this period there occurs a loss of opacity through the combination of the opacifying agents with the glass more or less.

Among its objects my invention aims to prevent this loss of opacity by removing the enamel from the melting tank as rapidly as it is formed so that a more uniform product may be obtained with a smaller quantity of opacifiers, in this way increasing the value of the product and descreasing the cost of the mix or batch.

My invention further has for its object to increase the output of the enamel in a given time by melting it more rapidly, this operation being favored by constant removal of the melted portion of the batch, as well as by the continuity of the operation which saves the time at present required to tap and recharge the tank.

It is a further object of the invention to permit of the utilization of varying degrees of heat in the formation of the enamel which is particularly desired in the utilization of antimony oxide as the full white color of an antimony mix or batch is best secured by short exposure of the molten enamel to a high temperature and the color quickly developed without loss of opacity. The invention proposes to maintain the molten enamel in a highly heated state during its continuous discharge into the vat and to utilize for this purpose a source of heat separate from and supplemental to the heat of the melting tank so that it is possible to give any particular enamel the heat treatment best suited for it in view of the fact that this supplemental heat may be raised or lowered rapidly and as desired.

In the accompanying drawing I have shown an apparatus adapted to the carrying out of the method which my invention proposes, and while this apparatus shows the most desirable structural form so far devised, it is to be understood that the method may be carried out by other and different means.

In the drawing,

Figure 1 is a vertical longitudinal section through my improved apparatus, and

Figure 2 is a horizontal section taken substantially on line 2—2 of Figure 1.

Referring now to these figures I have shown a melting furnace at 10, generally similar to those now employed for a like purpose, having its top in the form of a crown 11 provided with a charging opening 12 and a cover 13 for this opening.

One side wall has an enlarged opening 14 as seen in Figure 2 through which the melting flame passes into the melting chamber, and the opposite side wall has an opening 15 in communication with a stack 16. Within the lower portion of the melting chamber is a melting tank 17 of refractory material including surrounding walls and a floor, the latter of which inclines toward a discharge opening 18 at the central portion of the front wall of the furnace as seen in Figure 2.

The discharge aperture 18 opens, in accordance with my invention, into the inner end of a forwardly and downwardly inclined hot spout or discharge flue 19 whose lower portion or wall has a discharge aperture 20 opening downwardly and at a point some distance from its extreme outer end. This discharge aperture of the hot spout or discharge flue 19 coincides with the usual opening in a flue supporting plate 21, above the vat 22 containing water and into which a continuous discharge takes place.

That portion of the hot spout or discharge flue 19 between its downwardly opening discharge aperture 20 and its extreme outer end is loosely filled with refractory blocks 23 of broken form and the extreme outer end of the spout or flue receives a burner nozzle 24 leading from a burner pipe 25 which constitutes a source of heat thrown into the discharge spout or flue separate from the melting heat of the furnace and capable of being rapidly raised or lowered with respect to the heat of the furnace.

In carrying out my method with the apparatus as illustrated, a batch or mix is introduced into the melting chamber and within the melting tank 17, from time to time, through the charging aperture 12 of the furnace, and as soon as melting of the batch commences, the molten enamel runs downwardly upon the inclined base of the tank to the tank discharge opening 18 and from thence through the heated spout or discharge flue 19 and the discharge aperture 20 thereof into the vat 22. This discharge takes place in a continuous stream, and removing as it does, the molten material as rapidly as it melts, the rapidity of the melting operation is considerably increased as compared to the ordinary operation in which the molten enamel collects in the lowest part of the melting tank.

This continuous removal of the molten enamel and its maintenance in a highly heated state while discharging not only avoids the present delays incident to tapping and recharging the melting tank but avoids the usual waste of what are known as "spout pieces," these being adhesions to the ordinary cold discharge spout having one end disposed adjacent to the tap hole and its opposite end over the vat.

It is obvious that by utilizing a separate source of heat for maintaining the spout or flue 19 in a highly heated state, I am enabled to rapidly vary this heat with respect to that existing in the melting tank and am enabled in this way to better control the color of the finished enamel particularly in connection with the use of antimony oxide, as the molten enamel as it flows in a shallow stream through the hot spout to the discharge aperture 20 may be subjected over a short space of time to an extremely high degree of heat from the supplemental burner of the spout.

It is obvious that the continuous discharge of the molten enamel as it is heated produces a product of greater uniformity than can be obtained at present and produces this product at a decreased cost compared to the present cost, by virtue not only of the mechanical advantages previously mentioned but by virtue of the further fact that practically all loss of opacity is defeated and opacifiers may be used in less amount in the first instance than is required with the method now employed.

I claim:

1. The herein described method of forming vitreous enamels which consists in utilizing a melting chamber formed to prevent collection of melted enamel in a pool and permit the enamel to run continuously from the chamber as it melts, in continuously withdrawing and quenching the melted enamel and in controlling the temperature of the enamel during its withdrawal and prior to quenching.

2. The herein described method of forming vitreous enamels which consists in utilizing a melting chamber formed to prevent collection of melted enamel in a pool and permit the enamel to run continuously from the chamber as it melts, in continuously withdrawing and quenching the melted enamel and in controlling the temperature of the enamel by means independent of the melting heat during withdrawal of the melted enamel and prior to its quenching 3. The herein described method of forming vitreous enamels which consists in introducing dry enamel forming material within a melting chamber formed to prevent the collection of liquid enamel in a pool, continuously withdrawing liquid enamel as it melts, and quenching the liquid enamel immediately upon withdrawal.

FREDERICK D. COOK.